United States Patent [19]
Anderson et al.

[11] 3,827,024
[45] July 30, 1974

[54] MOTION ALARM FOR VEHICLES
[75] Inventors: Arlynn W. Anderson, Peoria; Donald F. Coleman, Dunlap; Joe E. Fuzzell, Peoria; Jonny R. Greiner, Decatur; Robert G. Miller, Metamora, all of Ill.
[73] Assignee: Caterpillar Tractor Co., Peoria, Ill.
[22] Filed: June 12, 1972
[21] Appl. No.: 261,605

[52] U.S. Cl.................................. 340/70, 340/271
[51] Int. Cl........................................ B60q 5/00
[58] Field of Search............ 340/70, 271, 384 E, 83

[56] References Cited
UNITED STATES PATENTS
| | | | |
|---|---|---|---|
| 2,671,848 | 3/1954 | Swayne | 340/70 UX |
| 2,685,082 | 7/1954 | Beman et al. | 340/271 |
| 2,999,914 | 9/1961 | Stanaway | 340/271 UX |
| 3,120,655 | 2/1964 | Beason et al. | 340/271 |
| 3,214,731 | 10/1965 | Ballard | 340/70 |
| 3,284,796 | 11/1966 | Borsattino et al. | 340/384 E |
| 3,304,434 | 2/1967 | Koster | 340/271 X |
| 3,503,042 | 3/1970 | Skinner | 340/67 |
| 3,618,079 | 11/1971 | Denning et al. | 340/75 X |
| 3,629,819 | 12/1971 | Peterson | 340/70 |
| 3,701,139 | 10/1972 | Cruez | 340/271 |
| 3,728,676 | 4/1973 | Brown | 340/70 |
| 3,732,540 | 5/1973 | Platte | 340/83 X |
| 3,735,298 | 5/1973 | Colby | 340/70 X |

Primary Examiner—John W. Caldwell
Assistant Examiner—Marshall M. Curtis
Attorney, Agent, or Firm—Phillips, Moore, Weissenberger Lempio & Strabala

[57] ABSTRACT

A motion alarm for vehicles employs sensors actuated by elements of the vehicle drive system and control system to sound an audible alarm when the vehicle is deliberately backed up and also if uncontrolled unexpected motion occurs in either direction including times when the vehicle has been parked and is unattended. A logic circuit differentiates between reverse motion and forward motion in a manner whereby reverse motion always results in sounding an alarm while deliberate controlled forward motion maintains the alarm quiescent.

9 Claims, 2 Drawing Figures 3,827,024

MOTION ALARM FOR VEHICLES

BACKGROUND OF THE INVENTION

This invention relates to vehicles and more particularly to vehicle safety alarm systems for warning bystanders of certain forms of vehicle motion.

Due to the limited operator visability toward the rear of many vehicles audible "backup" alarms are often provided to warn personnel in the area that the vehicle is moving backward. Such alarms are normally actuated by movement of the operator's transmission shift lever into the reverse position. However, it has been recognized that greater safety may be realized if means are also provided to sound the audible alarm at any time that the vehicle is moving backward regardless of the position of the transmission shift lever and including times when the vehicle has been parked and is unattended. Governmental regulations are proposed in the United States of America to require such a system on heavy earthmoving vehicles.

Accordingly, a simple economical and reliable system is needed which differentiates between forward and reverse motion of the vehicle without necessarily relying on operator actions and which actuates the alarm only under the desired conditions. Ideally, such a system should retain the capability of actuating the alarm when the transmission is deliberately shifted to the reverse position to provide immediate warning when the vehicle is being prepared to move backward.

SUMMARY OF THE INVENTION

This invention is an economical and highly reliable motion alarm system, readily adaptable to a variety of vehicles or the like, which distinguishes between forward and reverse vehicle movement and which actuates an alarm in the presence of reverse movement whether deliberate or uncontrolled and without regard to the presence or absence of an operator. For this purpose the invention employs sensors which are continuously operative to detect movement of a vehicle wheel or other mechanism linked thereto and which generates electrical signals indicative of such movement. Circuit logic interprets such signals and actuates alarm means under predetermined conditions.

In a preferred form, the invention still further enhances safety by distinguishing between forward motion which is deliberately initiated by the operator and uncontrolled forward motion and activates the alarm in response to forward motion if it is uncontrolled and is effective for this purpose when the vehicle has been parked and is unattended. Also in the preferred form, the invention actuates the alarm immediately upon shifting of the operator's control lever into reverse, provided that the vehicle is in operation, in advance of actual rearward movement while providing means for preventing actuation of the alarm by unauthorized shifting of the transmission control lever while the vehicle is shutdown unless such shifting is accompanied by or followed by actual movement.

Accordingly, an object of this invention is to provide an economical, highly reliable motion alarm for indicating when a vehicle is moving backward including both deliberate and uncontrolled backward movement and which is operative for this purpose when the vehicle is shutdown and unattended as well as when the vehicle is being operated.

Another object of this invention is to provide a motion alarm which is actuated in response to motion in either direction of an unattended vehicle.

Another object of this invention is to provide a motion alarm which differentiates between forward and reverse motion and wherein reverse motion always results in actuation of an alarm while the alarm is not actuated during deliberate controlled forward motion.

Other objects and advantages of the present invention will be apparent upon reference to the accompanying drawings and following description.

DESCRIPTION OF THE PREFERRED EMBODIMENT

Figure 1:
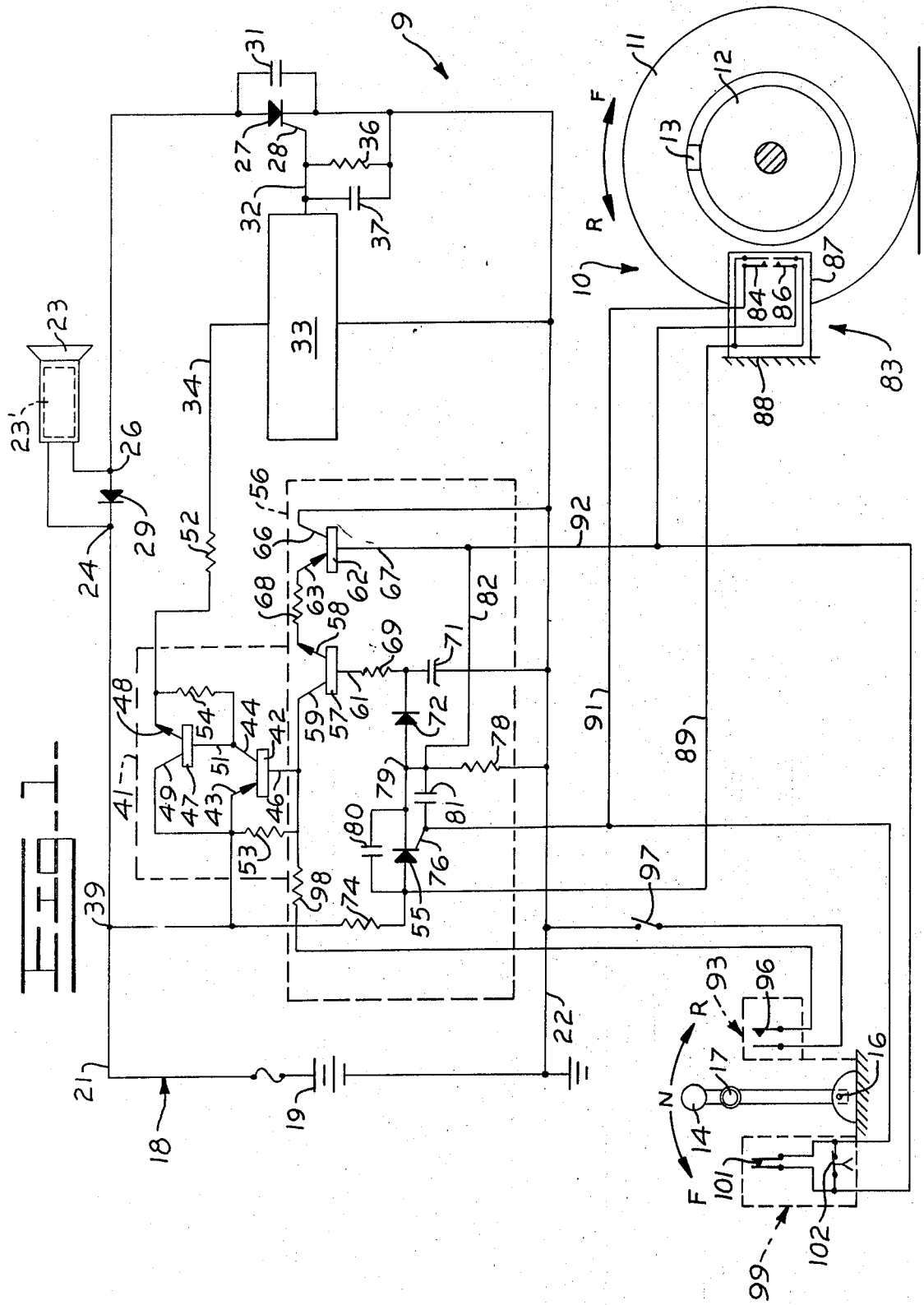
FIG. 1 is a schematic diagram of a vehicle motion alarm system in accordance with the invention.

Referring initially to FIG. 1 of the drawings, a motion alarm system 9 is shown applied to a vehicle 10 of which only a drive wheel 11 and certain other elements to be described are depicted inasmuch as the vehicle may otherwise be of conventional construction. Vehicle elements with which the invention directly co-acts include a member which must necessarily rotate when the vehicle moves in either direction such as a brake drum 12 secured to the wheel 11 in this example. For purposes to be described hereinafter, a permanent magnet 13 is attached to brake drum 12 for rotation therewith. The vehicle 10 further includes a manually manipulatable transmission shift lever 14 movable in this example in an arc about a pivot 16. In an earthmoving vehicle, for example, shift lever 14 may typically be shiftable into either a forward, neutral, or reverse position indicated by letters "F", "N" and "R" respectively in FIG. 1. To enable the alarm system 9 to sense the position of shift lever 14, a permanent magnet 17 is secured to the lever.

Motion alarm 9 includes an alarm circuit 18 powered at all times from a DC power source such as the vehicle battery 19. An audible electrically actuated horn 23 or other indicator means has a positive terminal 24 connected to the positive side of battery 19 through a B+ conductor 21 and has a negative terminal 26 connected to the negative side of the battery through a solid state switch such as an SCR (silicon controlled rectifier) 27 and a B− conductor 22. Thus application of voltage to the control gate 28 of SCR 27 switches the SCR to conductive condition and causes the horn 23 to sound. While an SCR remains conductive after a gating signal until current flow in the load circuit is stopped, gating on of SCR 27 does not continuously sound the horn 23 for any significant length of time inasmuch as the horn used in this embodiment is of the known type having internal means 23' which cyclically opens the circuit between horn terminals 24 and 26 at a rate corresponding to the audio frequency of the horn which may typically be 200 to 300 cycles per second. Since the horn itself cyclically interrupts the load circuit of SCR 27, for practical purposes the SCR remains conductive only as long as a gating signal is supplied thereto. A diode 29 is connected between the horn terminals 24 and 26 to bypass negative voltage transients while a capacitor 31 is connected in parallel with SCR 27 to protect the SCR from voltage transients.

The signal to control gate 28 of SCR 27 is received through an output conductor 32 from a beep frequency oscillator 33. Oscillator 33 may be of any suitable conventional type, such as a relaxation oscillator or a free running multivibrator, which converts a continuous DC voltage received on an input conductor 34 to an intermittent signal for gating the SCR 27 into conduction at a predetermined frequency to cause the horn 23 to sound intermittently rather than continuously. An intermittent sound is generally more effective in attracting the attention of bystanders. For this purpose oscillator 33 may typically operate at a frequency of 1.5 cycles per second. The output of oscillator 33 is developed across an output resistor 36 connected between conductors 32 and 22 in parallel with a capacitor 37.

To energize oscillator 33 and thus horn 23 when vehicle movement is sensed under conditions to be described, an amplifier circuit 41 is connected between the oscillator input conductor 34 and a B+ terminal 39 at B+ conductor 21. Amplifier circuit 41 in this example includes a control PNP transistor 42 and an output NPN transistor 47 with the emitter 43 of the control transistor and the collector 49 of the output transistor being connected to the B+ terminal 39. The collector 44 of control transistor 42 connects to the base 51 of output transistor 47 which has an emitter 48 connected to the oscillator input conductor 34 through a load limiting resistor 52. A bias resistor 53 connected between B+ terminal 39 and base 46 of control transistor 42 normally maintains transistor 42 in a non-conductive condition. A resistor 54 is connected between the emitter 48 and base 51 of output transistor 47 and provides reverse bias therefore during periods when transistor 42 is non-conductive. Conduction through transistor 42 forward biases transistor 47 into conduction to energize oscillator 33 and thereby sound the horn 23. Accordingly, horn 23 is actuated whenever control transistor 42 is made conductive by reduction of the positive voltage at base 46 thereof. This is accomplished, under conditions to be described, by logic circuit means 56.

Circuit means 56 includes an NPN transistor 57 and a PNP transistor 62 with the oscillator 59 of transistor 57 being connected to the base 46 of transistor 42 and with the emitters 58 and 63 of transistors 57 and 62 respectively being interconnected through a current limiting resistor 68. The collector 66 of transistor 62 is connected to B-conductor 22. A resistor 69 and capacitor 71 are connected in series between the base 61 of transistor 57 and B-conductor 22. A current limiting resistor 74, a switch formed by an SCR 55 and a diode 72 are connected in series between B+ terminal 39 and the junction between resistor 69 and capacitor 71. Circuit means 56 further includes a resistor 78 connected between B- conductor 22 and a junction 79 between SCR 55 and diode 72 which junction is also connected to base 67 of transistor 62 by a conductor 82. A capacitor 80 is connected across SCR 55 and another capacitor 81 is connected between the gate 76 of SCR 55 and junction 79 to protect the SCR against transient voltage spikes.

Logic circuit 56 actuates horn 23, under conditions to be described, in response to input signals indicative of movement of wheel 11 and indicative of the position of gear shift lever 14. Accordingly, the means for originating such input signal will first be described in order to facilitate an understanding of the operation of circuit means 56.

A first, rotation sensing means 82 detects rotation and direction of rotation of the wheel 11 and transmits this information to the logic circuit means 56. In this example sensing means 83 has a pair of normally opened reed switches 84 and 86 situated in a housing 87 which is secured to a portion of the vehicle frame 88 in proximity to the brake drum 12 whereby the two switches are momentarily closed by the field of magnet 13 when the wheel turns. The two switches 84 and 86 are slightly spaced apart to prevent simultaneous closing and opening but such spacing is sufficiently small to cause the closed periods of the two switches, for each revolution of wheel 11, to overlap. Thus, the sequence in which the switches 84 and 86 are closed during each wheel revolution is indicative of the direction of vehicle movement.

One side of switch 84 connects to the B+ terminal 39 through a conductor 89 and resistor 74 and a conductor 91 connects the other side of switch 84 with control gate 76 of SCR 55. Switch 86 is connected between conductor 89 and another conductor 92 leading to base 67 of transistor 62.

A second sensing means 93 responds to movement of gear shift lever 14 to the reverse position by conditioning amplifier circuit 41 to energize oscillator 33 and thereby sound horn 23. Second sensing means 93 has a normally open reed switch 96 positioned to be closed by the magnet 17 attached to lever 14 when the lever is moved to the reverse setting thereof. One side of switch 96 connects to B-conductor 22 through a manually operable switch 97 while the other side connects to base 46 of transistor 42 through a resistor 98. Switch 97 is manually closed when the vehicle is in operation and is manually opened when the vehicle is shutdown thereby preventing the horn 23 from being sounded solely as a result of someone tampering with the shift lever 14 when the vehicle is parked and not moving. As will be discussed in more detail, opening of switch 97 does not prevent sounding of the horn in the presence of actual movement of the vehicle.

The above described first and second sensing means 83 and 93 provide the necessary input information to assure actuation of the horn 23 when the vehicle is moving backward under any conditions. To provide still greater safety, a third sensing means 99 may be used in conjunction therewith to provide for sounding the horn 23 when the vehicle is unattended and rolls forward from brake failure or some other cause. Third sensing means 99 includes a normally closed reed switch 101 and a normally closed fluid pressure actuated switch 102. Switch 101 is positioned to be opened by the magnet 17 on shift lever 14 when the lever is moved to the forward drive setting. Pressure switch 102 may be of the known type which is opened by the vehicle engine oil pressure when the vehicle is in operation. Switches 101 and 102 are connected in parallel across conductors 91 and 92 to condition the logic circuit 56 to sound horn 23 upon movement of the vehicle in the forward direction as well as the backward direction when the vehicle is shutdown and also in the event that the vehicle is not shutdown but moves forward at a time when the shift lever 14 is not at the forward position.

In operation, the alarm system 9 is connected to the battery 19 at all times and is activated to sound the horn 23 by a number of different conditions, all of which initiate closing of a circuit between the base 46 of amplifier control transistor 42 and B- conductor 22 to bias transistor 42 into conduction. As heretofore described, conduction through control transistor 42 results in energization of horn 23.

A first condition which biases control transistor 42 to activate the horn 23 occurs while the vehicle is being operated and the operator moves shift lever 14 to the reverse position in preparation for deliberate reverse vehicle movement. As previously discussed, manually operable switch 97 is closed while the vehicle is in operation. Accordingly, shifting lever 14 to the reverse position at this time causes magnet 17 to close reed switch 93 thereby connecting B- conductor 22 to the base of control transistor 42 through resistor 98 to initiate sounding of the horn. Shifting lever 14 out of the reverse setting opens switch 96 removing the bias from control transistor 42. Transistor 42 then reverts to the non-conductive condition and deenergizes the horn 23 unless one of the other horn actuating conditions is present at that time.

A second condition which activates horn 23 is actual rearward movement of the vehicle regardless of the position of shift lever 14 and regardless of the condition of manually operable switch 97. The first condition described above is met only when the vehicle is about to be deliberately driven backward and normally causes sounding of the horn slightly in advance of the actual rearward movement. Thus the second condition is redundant at certain times when the horn is already being sounded as a result of the first condition.

Considering now the circuit action under the second condition, when the vehicle backward in this example the wheel 11 rotates counterclockwise as viewed in FIG. 1 causing magnet 13 to close and open switches 84 and 86 in overlapping sequence. Switch 84 is closed first and applies positive voltage from resistor 74 to the gate 76 of SCR 55. At that time, one or both of sensor switches 101 and 102 are closed. (Switches 101 and 102 are both open only when the engine is operating and the gear shift lever 14 is at the forward drive setting. The vehicle is necessarily moving forward, rather than backward in that situation if it is equipped with a power shift or automatic transmission.) Since one or both of sensing switches 101 and 102 are closed, the positive voltage applied to the gate of SCR 55 is also applied to terminal 79 at the cathode side of the SCR via leads 92 and 82 and thus the SCR does not conduct notwithstanding the fact that the gating signal is present. The positive voltage applied to terminal 79 is simultaneously transmitted to the base 67 of transistor 62 holding such transistor in a non-conductive state and also charges capacitor 71 through diode 72 to bias transistor 57 into conduction through resistor 69.

Continued counterclockwise rotation of the wheel 11 then closes sensor switch 86 and then subsequently opens switch 84 but positive voltage continues to be supplied to terminal 79 through conductors 92 and 82 until further wheel motion also opens switch 86. With both of switches 84 and 86 again open, positive voltage is removed from terminal 79 causing transistor 62 to become conductive. The charge on capacitor 71 maintains transistor 57 conductive for a predetermined period, typically 4 seconds, until the capacitor has discharged through resistor 69 and transistors 57 and 62. As both of transistors 62 and 57 are conductive during this period control transistor 45 is also biased in conduction to sound horn 23 as previously described. The discharging of capacitor 71 during this period eventually turns off transistor 57 thereby also turning off control transistor 42 and stopping sounding of the horn 23. The above described cycle is repeated each time magnet 13 passes the switches 84 and 86 during subsequent counterclockwise revolutions of wheel 11 and if wheel motion is rapid, capacitor 71 remains charged to continuously maintain control transistor 42 conductive.

In the above description of the second condition which activates horn 23, it was pointed out that SCR 55 does not actually conduct notwithstanding the presence of gating voltage since one or both of sensing switches 101 and 102 are closed to reverse bias the SCR while the gating signal is present. In a vehicle equipped with a power shift transmission rearward motion will not normally occur with the engine running and the transmission set at forward drive and thus the second condition is unlikely to occur with both switches 101 and 102 open. However, this is a remote possiblity if breakage of a drive train element of the vehicle should occur and is a more common occurance in a vehicle eqipped with a manually shifted transmission and manual clutch, e.g. in starting forward on an upgrade. It should be observed that the circuit remains functional to sound the horn in the presence of rearward vehicle movement even if switches 101 and 102 are both open. In that event SCR 55 is briefly gated into conduction when switch 84 is first closed but such conduction at that time merely supplies positive voltage to terminal 79 as occured in the above described case. Conduction through the SCR 55 is subsequently stopped during the interval when switch 84 has reopened, removing the gating signal, with switch 86 momentarily remaining closed to reverse bias the SCR and stop conduction therethrough. Upon opening of switch 86, the horn is energized as described above.

In operation under the second condition described above, the logic circuit 56 detects the direction of wheel rotation and does not energize the horn 23 in response to forward motion while the vehicle is being operated and shift lever 14 has been positioned at the forward drive setting. When the vehicle is being operated and deliberately driven forward both of sensor switches 101 and 102 are open. The forward motion of the vehicle results in clockwise rotation of the wheel 11 as viewed in FIG. 1 causing the magnet 13 at wheel 11 to open and close the switches 84 and 86 in a reversed sequence from that described above. Magnet 13 causes switch 86 to close first thereby applying positive voltage to the base of transistor 62 through conductor 92 and transistor 62 is thereby held non-conductive at that time. Closing of switch 86 also charges capacitor 71 through conductors 92 and 82 and diode 72 thereby biasing transistor 57 into conduction. Further clockwise motion of the wheel 11 then closes sensor switch 84 applying positive voltage to the gate of SCR 55 which momentarily remains unconductive because of the presence of positive voltage at the cathode side thereof from switch 86. However, further rotation of wheel 11 opens switch 86 removing positive voltage from the cathode side of SCR 55 while the gating signal remains supplied thereto through switch 84 and thus the SCR becomes conductive. Such condition through SCR 55 continues the application of positive voltage to the base of transistor 62 after switch 86 opens thereby holding transistor 62 non-conductive and preventing energization of the horn 23. It should be observed that SCR 55 remains conductive to block energization of horn 23, until one revolution of wheel 11 is substantially completed at which point reclosing of switch 86 applies positive voltage to the negative side of the SCR stopping conduction therethrough and reinitiating the cycle of operation described above. Thus horn 23 remains unenergized during deliberate forward vehicle movement.

A third condition under which circuit means 56 activates horn 23 is forward vehicle movement which is not deliberately initiated by the operator. Under this condition at least one of the sensing switches 101 and 102 is closed. If the vehicle had been shutdown, switch 102 is closed and if shift lever 14 has not been placed in the forward drive position, switch 101 is closed. A closed condition of either or both of switches 101 and 102 interconnects conductors 91 and 92. If at this time the vehicle moves rearwardly, the action of circuit means 56 is similar to that previously described with reference to the second condition as the occurance falls within the definition of the second condition as hereinbefore described. Forward motion of the vehicle with either or both of switches 101 and 102 closed initially closes sensor switch 86 biasing transistor 62 to a non-conductive state and charging capacitor 71 through conductors 92 and 82 and diode 72 thereby biasing transistor 57 into conduction. SCR 55 does not conduct although a gating signal is applied since positive voltage is also applied at the cathode side thereof at terminal 79. Further wheel motion closes sensor switch 84 but this does not immediately affect circuit conditions as positive voltage is already present at conductor 91 through the closed one of switches 101 and 102. Still further wheel motion then opens sensor switch 86 but, again, circuit conditions remain unaffected due to the closed condition of one or both of switches 101 and 102.

Upon further wheel rotation, switch 84 reopens removing the positive voltage from the base of transistor 62 which becomes conductive while transistor 57 remains conductive due to the base bias provided by the charge on capacitor 71. With both transistors 57 and 62 conductive, control transistor 42 is biased into conduction and horn 23 is energized. This cycle is repeated with each revolution of wheel 11 under the conditions defined above.

Figure 2:
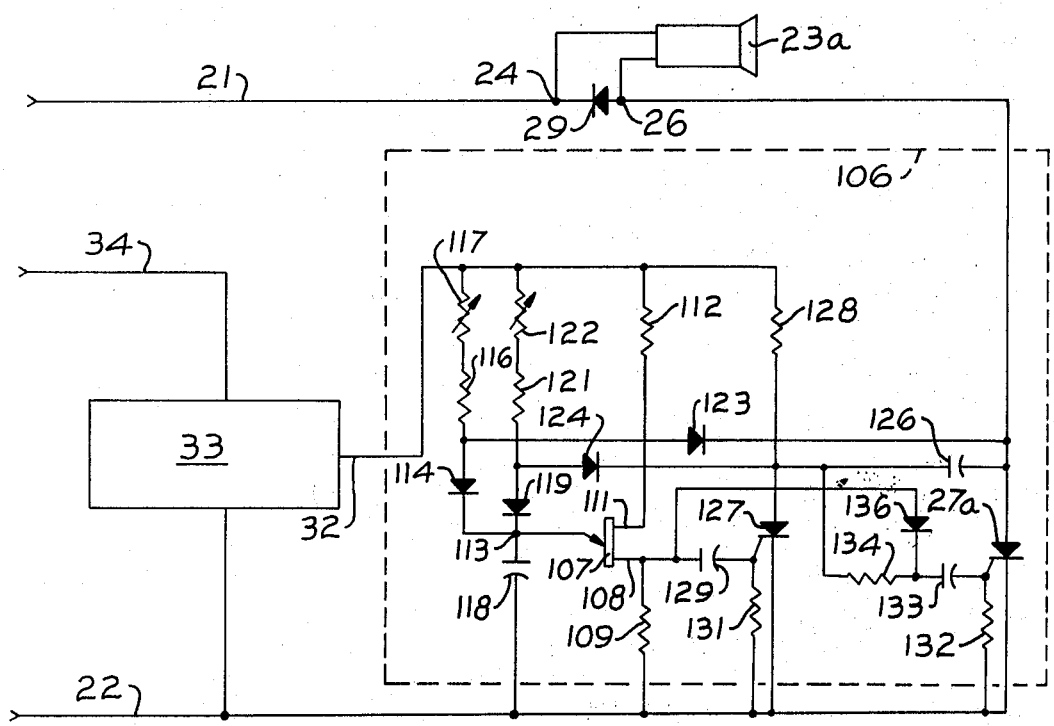
FIG. 2 illustrates a modification of a portion of the electrical circuit of FIG. 1 to adapt the circuit for use with another type of alarm device.

In the above described embodiment of the invention, horn 23 is energized under predetermined conditions by gating on of SCR 27. It is a general property of silicon controlled rectifiers such as SCR 27 that the device remains conductive once it is gated on until the anode-cathode circuit thereof is interrupted or else the potentials at the anode and cathode are equalized or reversed at least momentarily. For practical purposes the SCR 27 in the circuit of FIG. 1 performs like a solid state switch responsive to the presence of a gating signal at gate 28 since the horn 23 is of the form having internal mechanism 23' which cyclically opens the circuit between the horn terminals 24 and 26 and thus in effect cyclically opens the anode-cathode circuit of SCR 27 to stop conduction therethrough when the gating signal is removed from gate 28 of the SCR. However, if the circuit is utilized with a horn or other indicator device of the form which does not cyclically open the SCR circuit then additional provisions must be made to prevent the SCR 27 from continuing to conduct once it is gated on. Some solid state horns as well as other indicators such as lamps and the like do not provide such a cyclic interruption of the load circuit. FIG. 2 illustrates a modification of the portion of the circuit between the output 32 of oscillator 33 and the SCR 27A conntrolled thereby which provides the desired result where the horn 23A or the like is of a form which does not cyclically stop conduction through the SCR.

All portions of the system other than that depicted in FIG. 2 may be similar to the first embodiment and therefore will not be redescribed.

In the modification of FIG. 2, the SCR 27A which is connected in series wth horn 23A between B+ conductor 21 and B- conductor 22 is an internal component of a form of circuit component 106 known as a DC flasher. A DC flasher 106 has a control signal input, which in this system is the output signal conductor 32 of beep frequency oscillator 33, and functions to turn the output SCR 27A on and off at a predetermined frequency as long as voltage is applied to the input conductor 32. This frequency is selected to be in the audio range in the present system to provide the desired audible output from horn 23A.

Such a DC flasher 106 may include a uni-junction transistor 107 having a base 108 connected to B- conductor 22 through a resistor 109 and a base 111 connected to input conductor 32 through another resistor 112. The emitter of uni-junction 107 is connected to input conductor 32 through a junction 113, diode 114, resistor 116 and variable resistor 117. A capacitor 118 is connected between junction 113 and B- conductor 22. Terminal 113 is also connected to input conductor 32 through a diode 119, resistor 121 and variable resistor 122. An additional diode 123 is connected between the anode side of output SCR 27A and the junction between diode 114 and resistor 116 while still another diode 124 is connected between the junction between diode 119 and resistor 121 and the anode side of SCR 27A in series with a capacitor 126.

To commutate SCR 27A, an additional SCR 127 has an anode side connected to input conductor 32 through a resistor 128 while the cathode side connects to B- conductor 22. The gate of SCR 127 is connected to base 108 of unijunction transistor 107 through a capacitor 129 and is also connected to B- conductor 22 through a resistor 131. The gate of the output SCR 27A connects with B- conductor 22 through a resistor 132 and connects to the junction between diode 124 and capacitor 126 through a capacitor 133 and resistor 134. A diode 136 is connected between base 108 of uni-junction transistor 107 and the junction between resistor 134 and capacitor 133.

In operation, both SCRs 27A and 127 are initially non-conducting in the absence of voltage on the input conductor 32. Upon the application of such voltage to conductor 32 by beep frequency oscillator 33, firing of uni-junction transistor 107 is momentarily delayed while the capacitor 118 charges. During this interval, positive potential applied through resistors 128 and 134 establishes reverse bias at diode 136. Subsequently, uni-junction 107 fires causing a pulse to appear at base 108 thereof. Owing to the reverse bias at diode 136, only the commutating SCR 127 is gated on at that time. With SCR 127 on, capacitor 126 charges and the reverse bias is removed from diode 136. Capacitor 113 recharges producing a second pulse at base 108 which is able to turn on the output SCR 27A, as diode 136 is no longer reverse biased. As charged capacitor 126 is thereby effectively connected across SCR 127 to provide reverse bias thereat, SCR 127 is turned off. Conduction through SCR 27A also forward biases diode 123 causing capacitor 118 to recharge through resistors 122 and 121 and diode 119 and reestablishes reverse bias at diode 136. The next pulse at base 108 of uni-junction transistor 107 will again turn on SCR 127 and momentarily reverse bias SCR 27A to stop conduction therethrough. This cycle of operation continues as long as input 32 remains energized. Thus the circuit of horn 23A is intermittently open and closed at the cycling rate of DC flasher 106 which as noted above is selected to be within the audio range of frequencies. It may be noted that the conductive and non-conductive periods of output SCR 27A may be adjusted by means of variable resistors 122 and 117 respectively.

While the invention has been described with respect to certain preferred embodiments, it will be apparent that variations are possible and it is not intended to limit the invention except as defined in the following claims.

What is claimed is:

1. A motion alarm system (9) for a vehicle which has a rotatable element (12) that revolves in one direction when said vehicle moves forward and revolves in a reverse direction when the vehicle moves backward wherein said vehicle has an operator's control member (14) movable to a forward drive position for initiating forward motion of said vehicle and movable to a reverse drive position for initiating backward motion of said vehicle, comprising, in combination:

an electrically actuated indicator device (23), an electrical power source (19), switching means (27) of the form controlled by an electrical gating voltage, said switching means being connected between said indicator device and said power source, a first rotation sensing means (83) having a pair of signal producing means (84, 86) disposable adjacent said rotatable element for repeatedly producing a pair of electrical signals as said element revolves, whereby said pair of electrical signals are produced in a first sequence when said element revolves in said one direction and in a second reversed, sequence when said element revolves in said reversed direction, and circuit means (56,41) coupled between said pair of signal producing means and said switching means having means (56) for differentiating between said first and second sequences of said pairs of signals and further having means (41) for transmitting said gating voltage to said switching means in response to said second reversed, sequence signals and third sensing means (99) for detecting movement of said control member away from said forward drive position thereof and having means (101) for conditioning said circuit means to transmit gating voltage to said switching means in response to said pair of electrical signals irrespective of said sequence thereof when said control member is away from said forward drive position whereby said indicator device is further energized by forward motion of said vehicle but only if said control member is away from said forward drive position.

2. The combination defined in claim 1 further comprising a second sensing means (93) connected to said power source and having means (96) independent of said first sensing means for initiating transmission of said gating voltage to said switching means in response to movement of said control member to said reverse drive position.

3. The combination defined in claim 2 further comprising a manually operable switch (97) connected in series with said second sensing means whereby said second sensing means may be inactivated when said vehicle is shutdown to prevent energization of said indicator device solely by movement of said control member while said vehicle is shutdown.

4. The combination defined in claim 1 wherein said third sensing means has means (102) for detecting a shutdown condition of said vehicle and for conditioning said circuit means to transmit gating voltage to said switching means in response to said pairs of signals irrespective of said sequence thereof and irrespective of the position of said control member when said vehicle is shut down whereby said indicator device is energized by any movement of the shutdown vehicle.

5. The combination defined in claim 1 wherein said first sensing means is comprised of a pair of magnetically operable switches (84, 86) disposed adjacent said rotatable element of said vehicle and a magnet (13) secured to said rotatable element for sequentially operating said switches as said element revolves.

6. The combination defined in claim 1 wherein said first rotation sensing means comprises first and second switches (84,86) connected between said power source and separate first and second input conductors (91,92) of said circuit means for sequentially energizing said conductors in response to rotation of said rotatable element, said circuit means further comprising a gating voltage control device (42) connected between said power source and said switching means and further comprising means (57, 62) for conditioning said control device to conduct in response to energization of said first input conductor followed by an overlapping energization of said second input conductor and for conditioning said control device to be non-conductive in response to energization of said second conductor followed by overlapping energization of said first conductor and for conditioning said control device to be conductive in response to simultaneous energization of said input conductors.

7. The combination defined in claim 6 wherein said third sensing means (99) is connected across said first and second input conductors of said circuit means and has means for interconnecting said first and second input conductors to cause said simultaneous energization of said input conductors upon energization of either thereof when said control member is away from said forward drive position and also has means for interconnecting said first and second input conductor when said vehicle is shut down.

8. A motion alarm system (9) for a vehicle having a rotatable road wheel (11) which revolves in one direction during forward motion of the vehicle and revolves in an opposite direction during reverse motion of the vehicle and having a manually shiftable vehicle direction control element (14) shiftable between at least a forward drive position and a neutral position and a reverse position, comprising in combination:
  an electrically actuated horn (23),
  an electrical power source (19),
  switching means (27) connected between said horn and said power source, said switching means being of the form which is normally non-conductive and which is gated on by application of a gating voltage thereto,
  a first sensing means (83) having first and second magnetically actuated switches (84, 86) disposable adjacent said road wheel and having a magnet (13) rotatable with said road wheel to cyclically sweep past said switches as said wheel revolves, said switches being positioned for actuation in a first sequence as said vehicle moves in the forward direction and for actuation in a reverse sequence as said vehicle moves in the reversed direction wherein the actuated periods of said switches overlap during vehicle motion in either direction,
  circuit means (56, 41) connected between said first sensing means and said switching means and having a first input (91) connected to said power source through said first switch and having a second input (92) connected to said power source through said second switch, said circuit means having an output means (41) for transmitting gating voltage to said switching means when said second input is energized while said first input is already energized and for transmitting gating voltage to said switching means when said inputs are simultaneously energized,
  a second sensing means (93) having a switch (96) connected between said power source and said switching means for applying said gating voltage thereto upon movement of said operator's control element to said reverse position thereof, and
  third sensing means (99) having a normally closed switch (101) connected between said first and second inputs of said circuit means and having means (17) for opening said switch when said operator's control element is shifted to said forward drive setting thereof and further having additional switch means (102) for interconnecting said inputs of said circuit means when said vehicle is shutdown.

9. The combination defined in claim 8 wherein said circuit means comprises
  a control transistor (42) having an emitter collector circuit connected between a first side of said power source and said switching means for providing said gating voltage to said switching means upon conduction through said control transistor,
  a resistor (53) connected between said first side of said power source and the base of said control transistor for normally biasing said control transistor to a non-conductive state,
  a first additional transistor (57) and a second additional transistor (62) having emitter collector circuits connected in series between said first side of said power source through said first resistor and the other side of said power source whereby conduction through both additional transistors turns on said control transistor, said first additional transistor being of the form which is biased into conduction by application of a bias voltage corresponding to that of said first side of said power source to the base of said first additional transistor, and said second additional transistor being of the form which is biased into non-conduction by application of said bias voltage to the base thereof and having said base thereof connected to said second input of said circuit means
  a capacitor (71) connected between the base of said first additional transistor and said other side of said power source,
  a second resistor (78) connected between said second input of said circuit means and said other side of said power source,
  an SCR (55) having an anode-cathode circuit connected between said first side of said power source and said second input of said circuit means and having a gate connected to said first input of said circuit means whereby energization of said first input gates said SCR into conduction unless said second input is also energized at that time, and
  a diode (72) connected between said second input and said other side of said power source through said capacitor,
  whereby energization of either of said inputs charges said capacitor to temporarily turn on said first additional transistor while said SCR is turned on to hold said second additional transistor non-conductive if said first input remains energized at least briefly after energization of said second input has terminated.

* * * * *